United States Patent [19]

Young et al.

[11] Patent Number: 4,527,032

[45] Date of Patent: Jul. 2, 1985

[54] RADIO FREQUENCY INDUCTION HEATING DEVICE

[75] Inventors: Russel L. Young, Collinsville; David E. Margerum, Middletown, both of Ohio

[73] Assignee: Armco Inc., Middletown, Ohio

[21] Appl. No.: 439,777

[22] Filed: Nov. 8, 1982

[51] Int. Cl.³ .............................................. H05B 6/40
[52] U.S. Cl. ........................... 219/10.61 R; 219/10.43; 219/10.71; 219/10.79
[58] Field of Search ............... 219/10.79, 10.57, 10.43, 219/10.71, 10.69, 10.61 R

[56] References Cited

U.S. PATENT DOCUMENTS

| | | | |
|---|---|---|---|
| 2,361,517 | 10/1944 | White et al. | 219/10.71 X |
| 2,762,892 | 9/1956 | Park | 219/10.79 X |
| 2,777,041 | 1/1957 | Dustman | 219/10.79 |
| 3,185,810 | 5/1965 | Peschel et al. | 219/10.69 |
| 3,242,299 | 3/1966 | Laughlin et al. | 219/10.79 X |
| 3,444,346 | 5/1969 | Russell et al. | 219/10.79 X |
| 3,842,234 | 10/1974 | Seyfried | 219/10.79 |
| 4,292,489 | 9/1981 | Gerber | 219/10.79 X |

Primary Examiner—Philip H. Leung
Attorney, Agent, or Firm—Frost & Jacobs

[57] ABSTRACT

A radio frequency induction heater for locally heating a metallic work piece. The induction heater comprises an elongated conductor surrounded by a core of magnetic material having a narrow slot formed therein serving as the inductor core air gap. The conductor is connected across a source of radio frequency current. The induction heater is located adjacent the metallic work piece with the inductor core air gap very near (and preferably in contact with) that portion of the metallic work piece to be heated. When the radio frequency current is caused to pass through the conductor, the gap concentrates the flux entering the work piece, inducing voltages in the work piece resulting in eddy currents which flow in the work piece along and parallel to the gap. This, in turn, results in the rapid local heating of a narrow band of the work piece.

9 Claims, 5 Drawing Figures

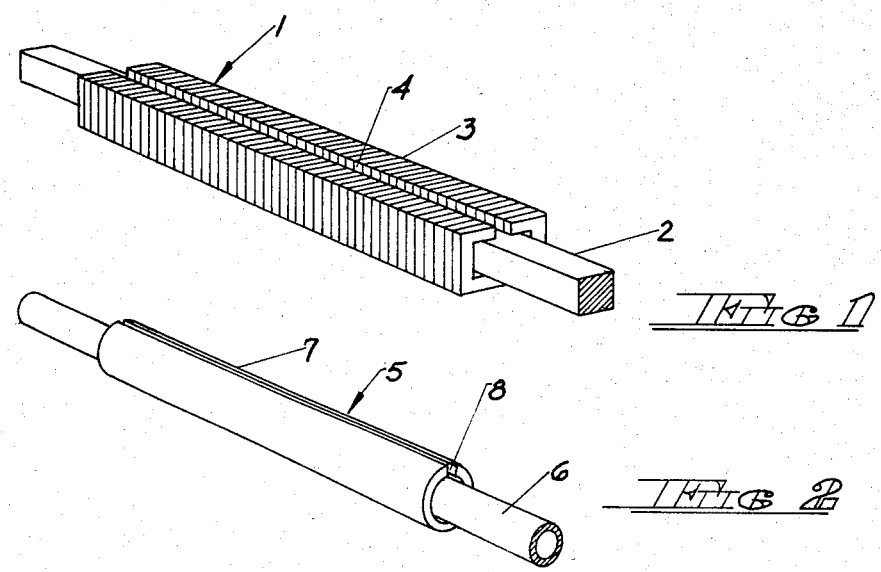
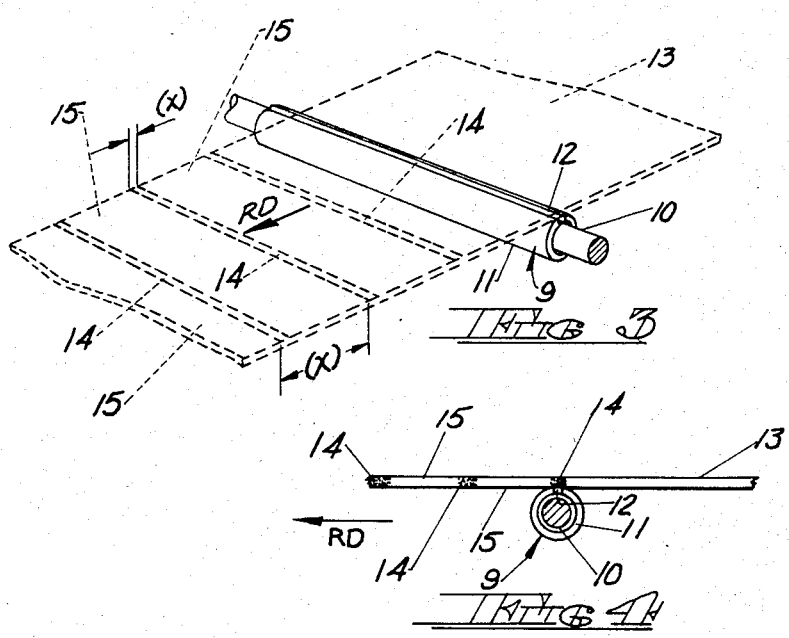

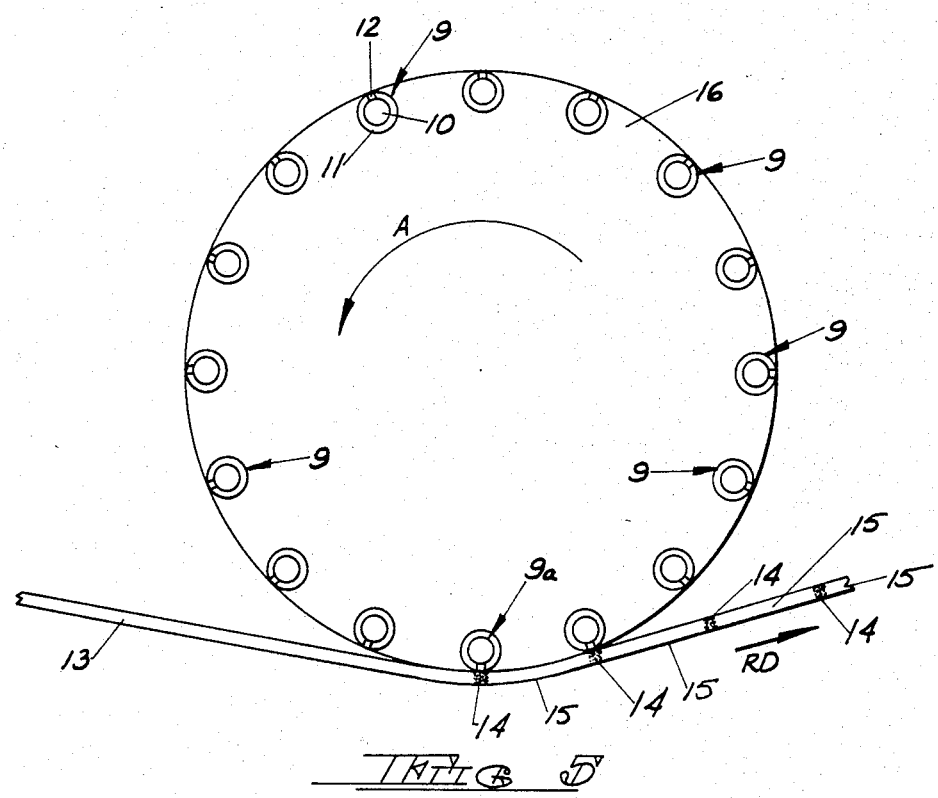

RADIO FREQUENCY INDUCTION HEATING DEVICE

TECHNICAL FIELD

The invention relates to a radio frequency induction heating device, and more particularly to a radio frequency induction heater capable of heat treating or annealing one or more narrow bands of a metallic work piece.

BACKGROUND ART

The radio frequency induction heating device of the Present invention has many and varied applications. For example, it could be used to heat treat a narrow portion of a machine tool, such as a cutter or the like, to harden that portion of the tool.

Co-pending application Ser. No. 06/439,909, filed Nov. 8, 1982 in the names of Jerry W. Schoen and Russel L. Young, and entitled LOCAL ANNEALING TREATMENT FOR CUBE-ON-EDGE GRAIN ORIENTED SILICON STEEL, teaches a local annealing treatment for both regular and high-permeability cube-on-edge grain electrical steels to improve the core loss thereof. According to this co-pending application, at some point in the routing of such electrical steels, after at least one stage of cold rolling and before the final high temperature anneal during which secondary grain growth occurs, the electrical steel is subjected to local annealing across its rolling direction, resulting in bands of enlarged primary grains. The bands of enlarged primary grains regulate the growth of the secondary cube-on-edge grains in the intermediate unannealed areas of the electrical steel strip during the final high temperature anneal. The enlarged primary grains of the annealed bands are, themselves, ultimately consumed by the secondary grains resulting in a cube-on-edge grain oriented electrical steel with smaller secondary grains and reduced core loss.

Co-pending application Ser. No. 06/439,884, filed Nov. 8, 1982, in the names of Jerry W. Schoen and Russel L. Young, and entitled LOCAL HEAT TREATMENT OF ELECTRICAL STEEL, discloses a process for improving the core loss of magnetic material of the type having a plurality of magnetic domains of such size that refinement thereof would produce significant core loss improvement. The magnetic material (such as cube-on-edge regular grain oriented silicon steel strip, cube-on-edge high-permeability grain oriented silicon steel strip and cube-on-face silicon steel strip) is subjected to a local heat treatment to produce parallel bands of heat treated regions extending substantially transverse the rolling direction of the magnetic material, with regions of untreated areas therebetween. The heat treatment alters the microstructure within the locally heat treated bands or regions, thereby regulating the size of the magnetic domains. The local heat treatment step is followed by an anneal resulting in improved core loss of the magnetic material. In an exemplary application to regular grain oriented silicon steel or high-permeability grain oriented silicon steel, the finished and finally annealed electrical steel, having a mill glass, an applied insulative coating, or both thereon, is subjected to local heat treatment wherein the heat treated bands are brought to a temperature above about 800° C. in less than 0.5 seconds (and preferably in less than 0.15 seconds). The locally heat treated strip is then annealed at a temperature of from 800° C. to about 1150° C. for a time of less than two hours. The improved core loss is permanent and is achieved without damage to the mill glass or applied insulative coating.

The radio frequency induction heater of the present invention can be used in the practice of the teachings of both of the above mentioned co-pending applications and their teachings are incorporated herein by reference. While the induction heater of the present invention can be used to perform any appropriate heat treatment or annealing step, for purposes of an exemplary showing it will be described in its application to locally annealing a silicon steel strip during the routing thereof as taught in the first mentioned co-pending application and in its application as a device to locally heat treat fully developed cube-on-edge or cube-on-face silicon steels, as taught in the second of the above mentioned co-pending applications. Therefore, when used herein and in the claims, terms such as "locally heating" should be construed broadly enough to cover both a local anneal and a local heat treatment.

The radio frequency induction heating device of the present invention is especially suitable for local annealing or heat treating in high speed commercial applications, owing to the nature of the high frequency currents, the high power output available and the electrical efficiency. The induction heater is simple in construction, having a lower first cost than many other heating systems. It is more energy efficient, potentially safer and easier to maintain than other heating systems, such as laser systems or the like.

DISCLOSURE OF THE INVENTION

According to the invention, there is provided a radio frequency induction heater for locally heating a metallic work piece. The induction heater comprises a conductor, or conductors, surrounded by a core of magnetic material. The core of magnetic material has a narrow slot formed therein and extending longitudinally thereof, so as to serve as the inductor core air gap. The conductor is connected across a source of radio frequency current.

In use, the induction heater is located adjacent the metallic work piece with the inductor core air gap very near (and preferably in contact with) that portion of the metallic work piece to be heated. When a radio frequency current is caused to pass through the conductor, the gap concentrates the flux entering the work piece. This induces voltages in the work piece resulting in eddy currents which flow in the work piece along and parallel to the gap. As a consequence, rapid local heating of a narrow band of the work piece occurs.

The radio frequency current may range from about 10 kHz to about 27 MHz. It will be understood by one skilled in the art that the minimum frequency is determined by the work piece thickness, while the maximum frequency is determined by the degree of eddy current penetration of the work piece required. Both the conductor and the core may have any appropriate cross sectional configuration. The conductor, the core, or both may be fluid cooled, as will be described hereinafter. The core is made of magnetic material and should be so constructed as to limit eddy currents therein. Thus, the core could be laminated of electromagnetic silicon steel or, preferably, could be made of a high resistivity magnetic material, such as ferrite.

When it is desired to produce a plurality of spaced, substantially parallel annealed or heat treated bands across an electrical steel strip (as is the case in the above mentioned co-pending applications), the induction heater is so located as to extend across the strip, and the strip is moved in the rolling direction. The individual annealed or heat treated bands are the result of pulsing the radio frequency current fed to the induction heater. It would also be within the scope of the present invention to produce the parallel spaced annealed bands in the strip by continuously passing the alternating current through the conductor and rotating the ferrite core. Under these circumstances, the core could have more than one gap. As yet another alternative, a plurality of induction heaters could be located in the peripheral portion of a roll, being evenly spaced about the roll with the inductor core air gap of each induction heater being located at the peripheral surface of the roll. As the electrical steel strip is drawn along the roll and the roll is rotated, each induction heater would be energized when its inductor core air gap is adjacent or in contact with the strip.

BRIEF DESCRIPTION OF THE DRAWINGS

FIG. 1 is a fragmentary perspective view of one embodiment of the induction heater of the present invention.

FIG. 2 is a fragmentary perspective view of another embodiment of the induction heater of the present invention.

FIG. 3 is a fragmentary perspective view of an induction heater of the present invention in its application to the provision of parallel spaced annealed or heat treated bands on a strip of electrical steel.

FIG. 4 is a fragmentary end elevational view of the structure of FIG. 3.

FIG. 5 is a semi-diagrammatic end elevational view of a roll carrying a plurality of induction heaters of the present invention to provide parallel spaced annealed or heat treated bands on a strip of electrical steel passing thereunder.

DETAILED DESCRIPTION OF THE INVENTION

Reference is first made to FIG. 1 wherein an embodiment of the induction heater of the present invention is generally indicated at 1. The induction heater 1 comprises a conductor 2 and a surrounding, elongated core 3. The conductor 2 may be of any appropriate current conducting material, such as copper, aluminum or the like. The core 3 is formed of a plurality of electrically insulated laminations made of an appropriate magnetic material such as electromagnetic silicon iron. The thickness of the laminations is exaggerated in FIG. 1 for purposes of clarity. By fabricating the core 3 of relatively thin laminations, eddy currents in the longitudinal directions of core 3 are greatly minimized relative to those induced in the work piece. The core 3 has a longitudinal slot 4 which constitutes the inductor core air gap which will be discussed in greater detail hereinafter. In such a structure, the conductor should be electrically insulated from the laminations by any appropriate means, such as an air gap as shown in FIG. 1, to assure that there is no direct current path to the work piece to be heated.

In FIG. 2, a second embodiment of the induction heater of the present invention is generally indicated at 5. This embodiment also comprises a conductor 6 and a longitudinally extending, surrounding core 7. Again, the conductor 6 can be of any appropriate current conducting material, such as copper or aluminum. In this instance, however, the core 7 is made of a ferrite material. By its very nature (i.e. high volume resistivity), ferrite material will minimize eddy currents in the longitudinal directions of core 7. The core 7 is also provided with a longitudinal slot 8 constituting the inductor core air gap. In this embodiment, the conductor is preferably electrically insulated by appropriate means from the core although some ferrite materials may have sufficient resistance to make this unnecessary.

The cores 3 and 7 may have any cross sectional configuration, such as circular, oval, rectangular, square, and the like. The same is true of conductors 2 and 6. To demonstrate this, core 3 is illustrated as having a rectangular cross sectional configuration while core 7 is shown as having a circular cross section. Similarly, conductor 2 is illustrated as having a square cross section while conductor 6 is shown having a circular cross section.

In the embodiments of FIGS. 1 and 2, the conductors 2 and 6 are each connected across a source of radio frequency current (not shown). The radio frequency current may range from about 10 kHz to about 27 MHz.

The ferrite core 7, characterized by a high volume resistivity and a moderately high permeability, is preferred over the laminated core 3. In some instances, when the current value is high, it is desirable to cool the conductor, the core, or both, to prevent excessive heating or melting. To this end, the conductor, the core, or both, may be fabricated in such a way that water or other cooling fluid may be circulated therethrough. To illustrate this, conductor 6, for example, is shown as being tubular in FIG. 2. The core could be cooled by air jets or other appropriate means.

The operation of the embodiments of FIGS. 1 and 2 is substantially identical for both. Thus, a description of the operation of the embodiment of FIG. 2 can be considered to be a description of the operation of the embodiment of FIG. 1 as well.

When a radio frequency current is passed through conductor 6, magnetic flux will be induced in core 7. Air gap 8, however, constitutes an interruption of the magnetic circuit of core 7. The flux tends to jump gap 8 and, in so doing, tends to flair outwardly of the core 7 at gap 8. As a result, air gap 8 tends to concentrate the flux along a finite path. When a metallic work piece is located adjacent (and preferably in contact with) gap 8, some of the flux at the gap will enter the metallic work piece inducing eddy currents therein. Adjacent the gap, these eddy currents flow alternately in both directions parallel to gap 8. Local annealing or heat treating occurs in the work piece due to these induced eddy currents therein and the electrical resistivity of the work piece.

The shape and length of the locally annealed or heat treated region of the work piece is influenced by the high frequency induction heater design, including the width of gap 8 in core 7, the proximity of the work piece to gap 8, in addition to the current magnitude and frequency and the treatment time. For example, the closer the work piece is to gap 8, the more efficient the heating operation is. For this reason, it is preferred that the work piece actually contacts core 7 at gap 8. Gap size determines the width of the magnetic field penetration of the work piece and thus the width of the heated region of the work piece. The narrower the gap, the less will be the width of the heated region of the work piece. Conversely, the wider the gap, the greater will be the width of the heated region of the work piece. Similarly, the greater the treatment time, the greater the width and depth of the heated region of the work piece. The shorter the treatment time, the narrower and shallower will be the heated region of the work piece. The depth of the heated region is also determined by the frequency.

For purposes of an exemplary showing, FIGS. 3 and 4 illustrate the application of an induction heater of the present invention to the practice of the inventions taught in the above identified co-pending applications. In FIGS. 3 and 4, the induction heater of the present invention is generally indicated at 9 and comprises a conductor 10 and core 11 of ferrite material. The core 11 has an inductor core air gap 12 formed therein. The induction heater 9 differs from induction heater 5 of FIG. 2 only in that the conductor 10 (which again may be of copper, aluminum or the like) is shown as a solid conductor, rather than as a tubular conductor as in FIG. 2. FIGS. 3 and 4 also illustrate a strip of electrical steel 13 having a rolling direction indicated by arrow RD. The electrical steel strip 13 is being drawn over the induction heater 9 in the rolling direction and in contact with core 11 at air gap 12.

In the practice of the teachings of the first mentioned co-pending application, the electrical steel strip 13 comprises a regular grain oriented silicon steel or a high-permeability grain oriented silicon steel prior to the final high temperature anneal during which the cube-on-edge orientation is achieved by secondary grain growth. The teachings of the first mentioned co-pending application are based on the discovery that if at some point in the routing of such electrical steels, after at least one stage of cold rolling and before the final high temperature anneal during which secondary grain growth occurs, the electrical steel is subjected to local annealing across its rolling direction, the parallel locally annealed bands of the steel strip will have enlarged primary grains. If the primary grains in the annealed bands are at least 30% and preferably at least 50% larger than the primary grain size in the unannealed areas between the annealed bands, the bands of enlarged primary grains will regulate the growth of the secondary cube-on-edge grains in the intermediate unannealed areas of the electrical steel strip during the final high temperature anneal. The enlarged primary grains of the annealed bands are, themselves, ultimately consumed by the secondary grains, resulting in a cube-on-edge grain oriented electrical steel with smaller secondary grains and reduced core loss. In FIG. 3, the annealed bands are indicated by broken lines at 14. The intermediate unannealed areas are indicated at 15. The annealed bands have a length in the rolling direction (RD) indicated as (x). The unannealed areas have a length in the rolling direction (RD) indicated as (X). The length (x) of the annealed bands 14 should be from about 0.5 mm to about 2.5 mm, while the length (X) of the unannealed regions 15 should be at least 3 mm.

The narrow, parallel, annealed bands 14 are produced by causing the strip 13 to move in the direction of arrow RD. The individual annealed bands are the result of pulsing the radio frequency current fed to conductor 10. The same result, with the required spacing (X) between the annealed bands 14 could be achieved by maintaining the radio frequency current in conductor 10 constant while rotating core 11 at an appropriate rate. Under these circumstances, the core 11 could be provided with more than one gap 12.

It has been found that the desired parameters taught in the first mentioned co-pending application can be achieved using an air gap 12 of from about 0.076 to about 2.5 mm in width. Current frequencies of from about 10 kHz to about 27 MHz can also be used. To maintain strip flatness, the strip must be maintained under pressure in excess of 2.5 MPa during the local annealing step. This can be accomplished by maintaining pressure on strip 13 between core 12 and a supporting surface (not shown) located above the strip.

As indicated above, FIGS. 3 and 4 can also be used to illustrate the practice of the teachings of the second mentioned co-pending application above. The teachings of the second mentioned co-pending application are based on the discovery that the core loss of cube-on-edge regular grain oriented silicon steel strip, cube-on-edge high-permeability grain oriented silicon steel strip, or cube-on-face silicon strip can be improved if the strip, characterized by a plurality of magnetic domains and fully developed magnetic characteristics, is subjected to a local heat treatment to produce parallel bands of heat treated regions extending substantially transverse the rolling direction RD of the strip with regions of untreated areas therebetween. The heat treatment alters the microstructure within the locally heat treated bands, thereby regulating the size of the magnetic domains. The local heat treatment step is followed by an anneal resulting in improved core loss of the magnetic material.

Thus, strip 13 in FIGS. 3 and 4 may be considered to represent one of the above listed electrical steels characterized by a plurality of magnetic domains and having fully developed magnetic characteristics. The bands 14 in this instance represent heat treated bands with untreated areas 15 therebetween.

In the practice of the second mentioned co-pending application, the length (x) of bands 14 should be less than 1.5 mm and preferably less than 0.5 mm. The length (X) of the untreated regions in the rolling direction RD should be at least 2 mm. Treatment times range from about 0.26 seconds to about 0.15 seconds or less. Current oscillating frequencies of from about 10 kHz to about 27 MHz can be used with success. The heat treated bands 14 are brought to a temperature above about 800° C. Again, the gap 12 should have a width of at least about 0.076 mm.

The heat treated bands 14 are produced in any of the ways described above with respect to the first mentioned co-pending application and, again, to maintain strip flatness, the strip should be maintained under a pressure in excess of 2.5 MPa during the heat treatment, as described with respect to the first mentioned co-pending application. The length (X) of the untreated regions in the rolling direction RD should be at least 2 mm.

FIG. 5 illustrates another embodiment of the present invention by which the teachings of either of the above mentioned co-pending applications can be practiced, producing in a strip 13 of electrical steel a plurality of annealed or heat treated bands 14 separated by untreated regions 15. In this embodiment, a roll 16 is provided. The roll 16 may be made of any non-magnetic, electrically non-conductive material. Near its peripheral edge, the roll 16 has a plurality of heating elements 9 mounted or embedded therein. The heating elements 9 are shown to be identical to the heating element 9 of FIGS. 3 and 4. They could, of course, be identical to heating elements 1 and 5 of FIGS. 1 and 2. Each heating element comprises a conductor 10 and a ferrite core 11 having an inductor core air gap 12 therein. The air gap of each induction heater 9 lies at the periphery of roll 16 and extends longitudinally of the roll. The induction heaters 9 are evenly spaced about roll 16 by a distance equivalent to the desired length (X) of the untreated spaces 15. The roll 16 is preferably powered to rotate in the direction of arrow A so as to be synchronized with the line speed of strip 13. When each of the induction heaters 9 achieve the position indicated at 9a in FIG. 5, a radio frequency current will be pulsed through its conductor 10 to produce an annealed or heat treated band 14.

Modifications may be made in the invention without departing from the spirit of it.

What is claimed is:

1. A radio frequency induction heater and a metallic strip which is moved in its rolling direction, said induction heater comprising an electrical conductor, an elongated core of magnetic material surrounding said conductor, a narrow slot in said core of a width of from about 0.003 to about 0.1 inch, said slot extending longitudinally of said core, comprising an inductor core air gap and forming substantially opposed pole faces in said core, a source of radio frequency current in the range of from about 10 kHz to about 27 MHz, said conductor being connectable across said source of radio frequency current, said heater being located transversely of said metallic strip with said metallic strip located adjacent and preferably in contact with said core at said gap therein, whereby narrow bands of said strip in parallel spaced relationship are heated when eddy currents are periodically induced therein by said radio frequency current.

2. The structure claimed in claim 1 wherein said conductor is made of metal chosen from the class consisting of copper and aluminum.

3. The structure claimed in claim 1 including means for cooling at least one of said conductor and said core.

4. The structure claimed in claim 1 wherein said core is fabricated of electrically insulated laminations of magnetic material.

5. The structure claimed in claim 1 wherein said core is fabricated of electrically insulated silicon iron laminations.

6. The structure claimed in claim 1 wherein said core is made of high resistivity magnetic material.

7. The structure claimed in claim 1 wherein said core is made of ferrite.

8. The structure claimed in claim 1 wherein said core is rotatably mounted with respect to said conductor.

9. The structure claimed in claim 1 including a roll and a plurality of said induction heaters evenly spaced about and mounted in the peripheral portion of said roll, said roll being made of non-magnetic and electrically non-conductive material, said core of each of said induction heaters extending longitudinally of said roll parallel to the axis of said roll, said gap of each of said induction heaters being located at the periphery of said roll.

* * * * *